(12) United States Patent
Sadowski (10) Patent No.: US 11,551,893 B2
(45) Date of Patent: Jan. 10, 2023

(54) ELECTRICAL APPARATUS WITH DOOR MOUNTED ROTARY HANDLE FOR OPERATING AN ELECTRICAL DEVICE AND AN INTERLOCK MECHANISM

(71) Applicant: ABB Schweiz AG, Baden (CH)

(72) Inventor: Mateusz A. Sadowski, Pierzchnica (PL)

(73) Assignee: ABB Schweiz AG, Baden (CH)

( * ) Notice: Subject to any disclaimer, the term of this patent is extended or adjusted under 35 U.S.C. 154(b) by 84 days.

(21) Appl. No.: 16/935,881

(22) Filed: Jul. 22, 2020

(65) Prior Publication Data

US 2022/0028635 A1 Jan. 27, 2022

(51) Int. Cl.
- *H01H 21/36* (2006.01)
- *H01H 21/30* (2006.01)
- *H02B 1/38* (2006.01)

(52) U.S. Cl.
CPC ............ *H01H 21/36* (2013.01); *H01H 21/30* (2013.01); *H02B 1/38* (2013.01)

(58) Field of Classification Search
CPC ........ H01H 21/36; H01H 21/30; H01H 19/24; H01H 11/00; H02B 1/38
USPC ........ 200/50.12, 50.18, 296, 330–332, 50.14
See application file for complete search history.

(56) References Cited

U.S. PATENT DOCUMENTS

| | | | |
|---|---|---|---|
| 2,888,529 A | 5/1959 | Platz | |
| 2,984,789 A | 5/1961 | O'Brien | |
| 3,007,016 A | 10/1961 | Cutler | |
| 3,299,232 A | 1/1967 | Geppert | |
| 3,299,233 A | 1/1967 | Sciba | |
| 3,312,872 A | 4/1967 | Davis | |
| 3,657,606 A | 4/1972 | Greger et al. | |
| 4,912,599 A | 3/1990 | Wittmer | |
| 4,957,447 A | 9/1990 | Hibbert et al. | |
| 6,023,030 A | 2/2000 | Latimer et al. | |
| 7,311,538 B2 * | 12/2007 | West | H02G 5/08 439/372 |
| 7,368,675 B2 | 5/2008 | Ishido et al. | |
| 8,847,088 B2 | 9/2014 | Bhathija et al. | |
| 9,425,588 B2 | 8/2016 | Fischer et al. | |
| 9,679,733 B2 | 6/2017 | Dunker | |
| 10,211,606 B2 * | 2/2019 | Kroushl | H01H 9/22 |
| 10,403,454 B2 | 9/2019 | Singh et al. | |
| 2008/0053797 A1 * | 3/2008 | Farrow | H01H 9/223 200/50.13 |
| 2009/0107819 A1 | 4/2009 | Samudrikam et al. | |

(Continued)

FOREIGN PATENT DOCUMENTS

| | | |
|---|---|---|
| CA | 649166 | 9/1962 |
| CA | 819217 | 7/1968 |

(Continued)

*Primary Examiner* — Edwin A. Leon
*Assistant Examiner* — Iman Malakooti
(74) *Attorney, Agent, or Firm* — Leydig, Voit & Mayer, Ltd.

(57) ABSTRACT

An electrical system includes an enclosure for housing an electrical device. The enclosure includes a door with an operating handle connected to a first shaft that turns the electrical device on or off when the door is closed. The operating handle is further operable to simultaneously rotate a cam assembly, which in turn rotates a second shaft which displaces an interlock mechanism for engagement or disengagement to a busway structure.

20 Claims, 6 Drawing Sheets

(56) References Cited

U.S. PATENT DOCUMENTS

2016/0099117 A1  4/2016 Dunker
2017/0372856 A1* 12/2017 Singh ..................... H01H 9/22

FOREIGN PATENT DOCUMENTS

| CA | 787522    | 11/1968 |
|----|-----------|---------|
| CN | 2153885   | 1/1994  |
| CN | 1093329 C | 5/2000  |
| CN | 108767791 | 6/2018  |
| CN | 107623296 | 1/2019  |
| JP | 2005149918| 6/2005  |

* cited by examiner

ELECTRICAL APPARATUS WITH DOOR MOUNTED ROTARY HANDLE FOR OPERATING AN ELECTRICAL DEVICE AND AN INTERLOCK MECHANISM

TECHNICAL FIELD

The present application generally relates to electrical systems, such as busway systems with tap-off devices, and more particularly, but not exclusively, to electrical systems with an enclosure for an electrical device that includes a door mounted rotary handle that operates the electrical device in conjunction with an interlock mechanism.

BACKGROUND

Electrical systems and operating safety remain an area of interest. Some existing systems have various shortcomings, drawbacks and disadvantages relative to certain applications. For example, in some busway systems, tap-off devices are provided with handles on a wall of the enclosure that are toggled with movement from an ON position to an OFF position, or from an OFF position to an ON position, to change a status of the electrical device. Other systems employ interlock devices in which a handle is provided to move a connected interlock device that prevents removal of the device. However, these systems require many moving parts and internal components, and do not provide for door operation in conjunction with interlock securement. Accordingly, there remains a need for further contributions in this area of technology.

SUMMARY

One embodiment of the present application is a unique electrical system with an electrical device in an enclosure and an interlock mechanism. Another embodiment is a unique handle system for providing access to the electrical device, changing a status of the electrical device, and for operating an interlock mechanism, that employs a two shaft actuating mechanism. Other embodiments include apparatuses, systems, devices, hardware, methods, and combinations for electrical systems, operating handles, interlock mechanisms, and related components. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
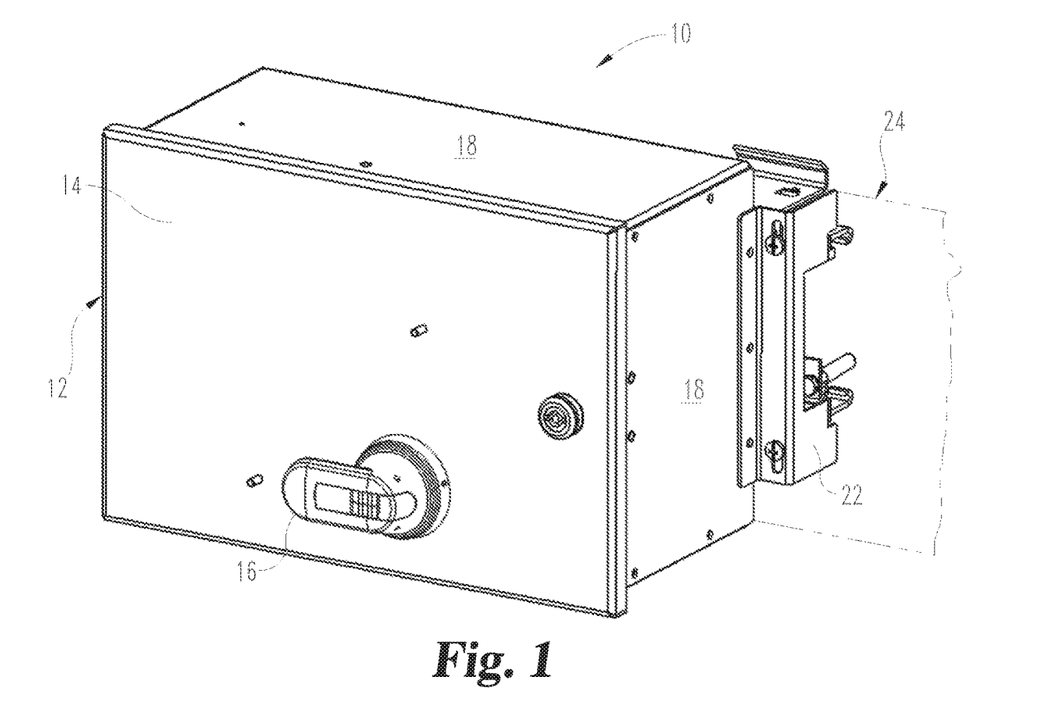
FIG. 1 illustrates a perspective view of a non-limiting example of an electrical system in accordance with an embodiment of the present application looking at a front side thereof.
Figure 2:
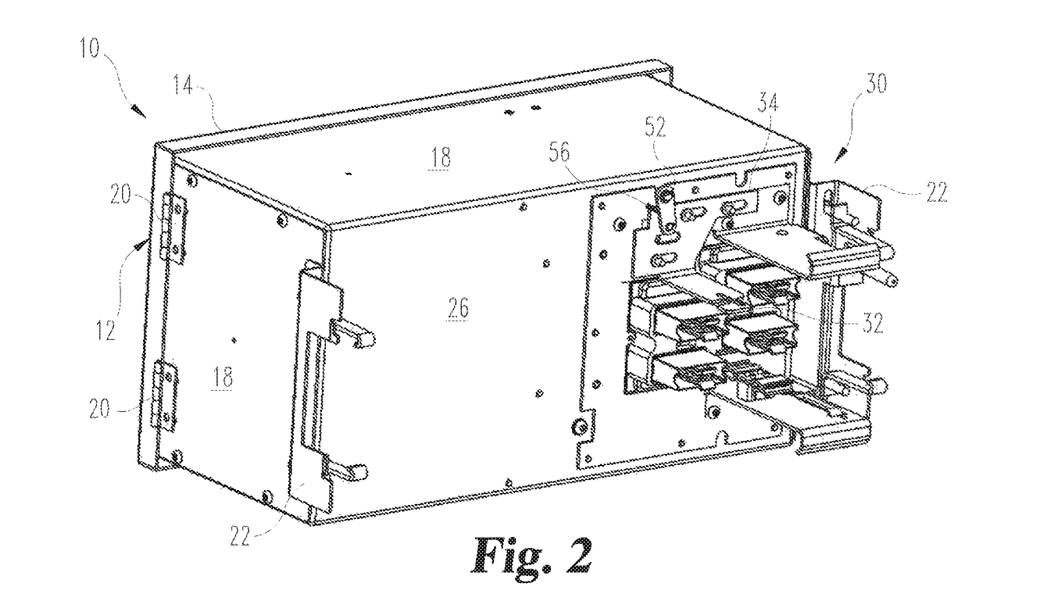
FIG. 2 is another perspective view of the electrical system of FIG. 1 looking at a back side thereof.
Figure 3:
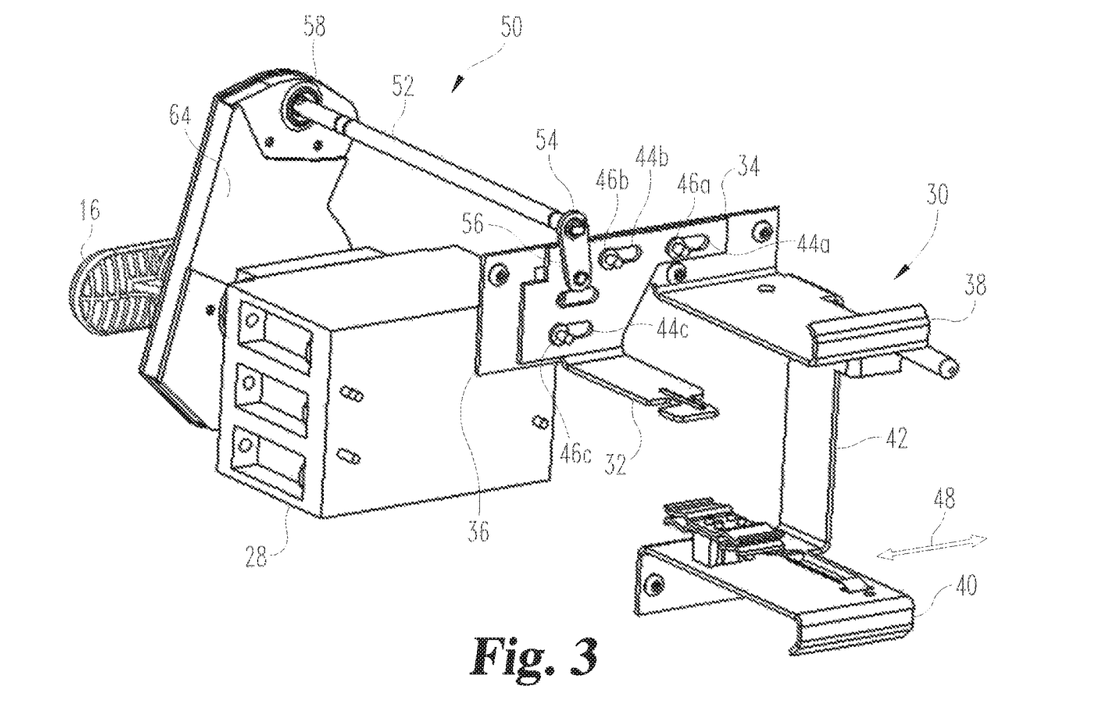
FIG. 3 is a perspective view looking at a back side of a handle system and interlock mechanism with the enclosure removed to illustrate some aspects of a non-limiting example of the electrical system of FIG. 1 in accordance with an embodiment of the present application.
Figure 4:
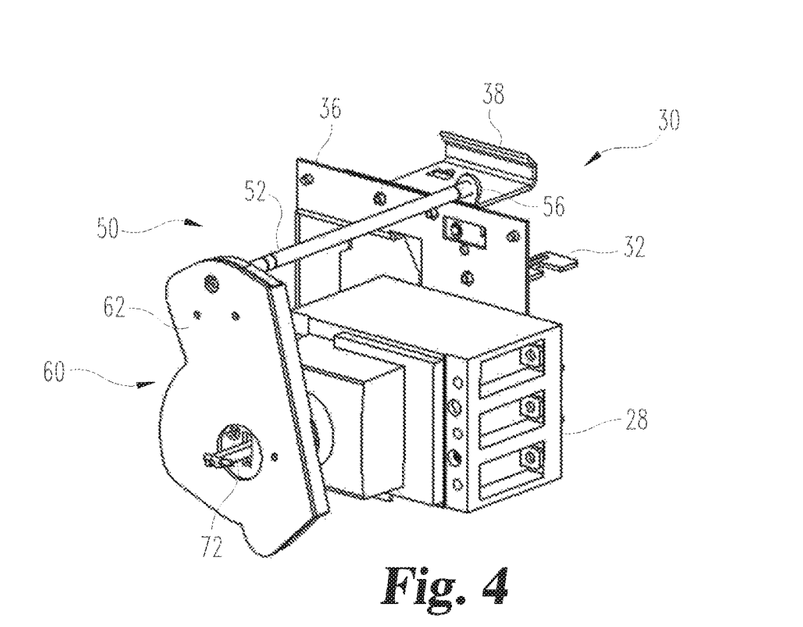
FIG. 4 is a front side perspective view of the interlock mechanism of FIG. 3 with the handle removed.
Figure 5:
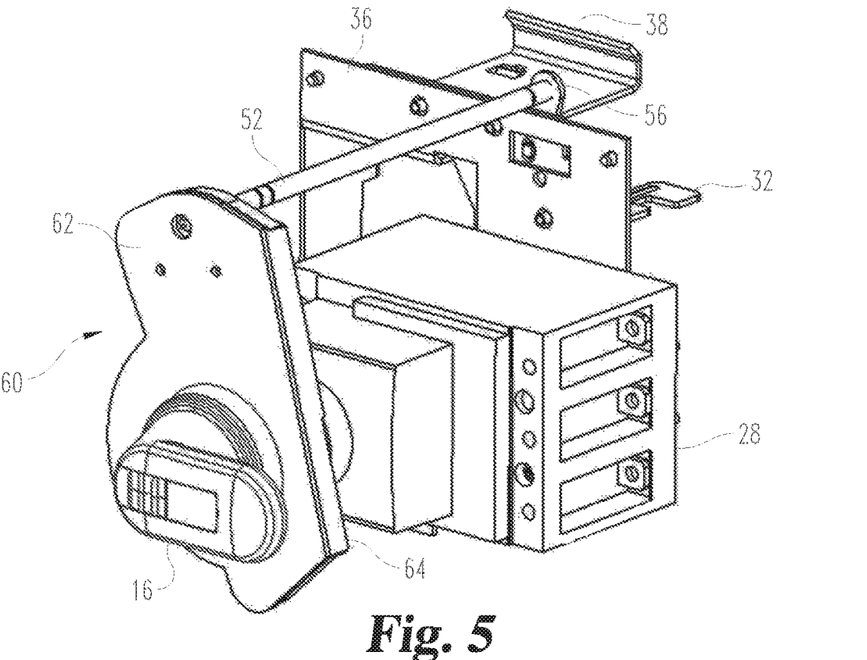
FIG. 5 is a front perspective view of the handle system and interlock mechanism of FIG. 3.
Figure 6:
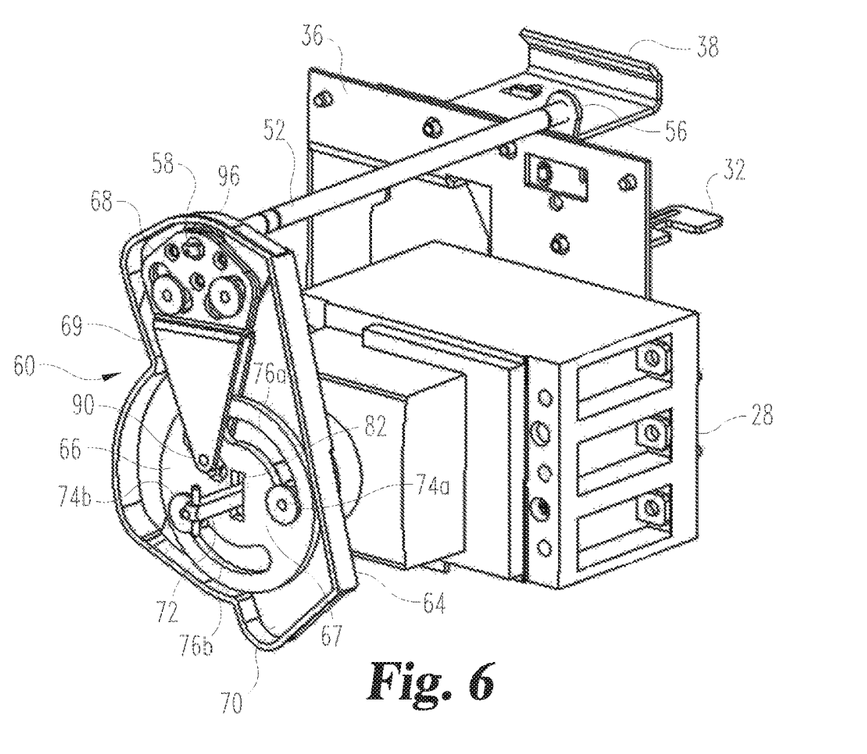
FIG. 6 is the view of FIG. 5 with the handle and cam cover removed.

Referring to FIGS. 1-2, some aspects of a non-limiting example of an electrical system 10 in accordance with an embodiment of the present disclosure are schematically depicted in front and back perspective views of a cabinet or enclosure 12. Electrical system 10 includes a cabinet or enclosure 12 having a door 14 with an operating handle 16 mounted to an external side of door 14. Operating handle 16 includes an L-shape to be readily grasped by an operator for rotation, but any suitable shape or configuration is contemplated. Door 14 is pivotally mounted to one of a plurality of sidewalls 18 of enclosure 12 with, for example, one or more hinges 20. Door 14 may also be a removable access panel in other embodiments.

In the illustrated embodiment, enclosure 12 is rectangular, but any suitable shape and/or configuration for enclosure 12 is contemplated. Door 14 provides access to the interior of enclosure 12, e.g., to permit access to an electrical device 28 (FIGS. 3-6), electrical connections thereto, and any other electrical or other components housed within enclosure 12. Enclosure 12 may be any electrical device enclosure. As used herein, the term "electrical device" should construed broadly to include any suitable electrical switching device, including circuit breakers, busway plug breakers/switches, and/or busway tap-off devices that are capable of being toggled on and off. Enclosure 12 may also include side brackets 22 extending from a rear wall 26 that is opposite of door 14. Side brackets 22 may be provide for mounting enclosure 12 to, for example, a busway structure 24, shown schematically in FIG. 1. Busway structure 24 may be any suitable structure associated with an electrical busway system.

Referring to FIGS. 3-6, operating handle 16 is shown (FIGS. 3 and 5 only) with an actuating system 50 and an interlock mechanism 30. Interlock mechanism 30 is operable to removably couple the electrical system 10 to, for example, the busway structure 24. Interlock mechanism 30 includes an interlock device 32 extending outwardly from a slide plate 34. Interlock device 32 and slide plate 34 may be provided as a single element, or as separate components attached to one another. Slide plate 34 is movably mounted to a mounting plate 36 that is engageable to rear wall 26 of enclosure 12. Interlock mechanism 30 further includes first and second U-shaped mounting arms 38, 40 connected by a cross member 42 that are also engageable to rear wall 26. Mounting arms 38, 40 may be provided for mounting enclosure 12 to busway structure 24.

Slide plate 34 includes first, second, and third slots 44a, 44b, 44c that receive respective ones of first, second, and third studs 46a, 46b, 46c extending from mounting plate 36 through slide plate 34. As discussed further below, the studs 46a, 46b, 46c retain the slide plate 34 on mounting plate 36 while allowing interlock device 32 to be displaced linearly back and forth as indicated by arrow 48 to interlock the electrical system 10 with the busway structure 24 when electrical device 28 is switched on by operating handle 16, as discussed further below.

In order to displace interlock device 32, slide plate 34 is couple to actuating system 50 with a first shaft 52. Actuating system 50 includes an interlock cam having a linking arm 56 fixedly coupled at one end to first end 54 of first shaft 52 and pivotally coupled at the other end to slide plate 34. The second end 58 of first shaft 52 is connected to a cam assembly 60 of actuating assembly 50, which is operable via operating handle 16 to rotate first shaft 52 and operate linking arm 56 and displace interlock device 32 as indicated by arrows 48, depending on the direction of rotation of operating handle 16.

Figure 7:
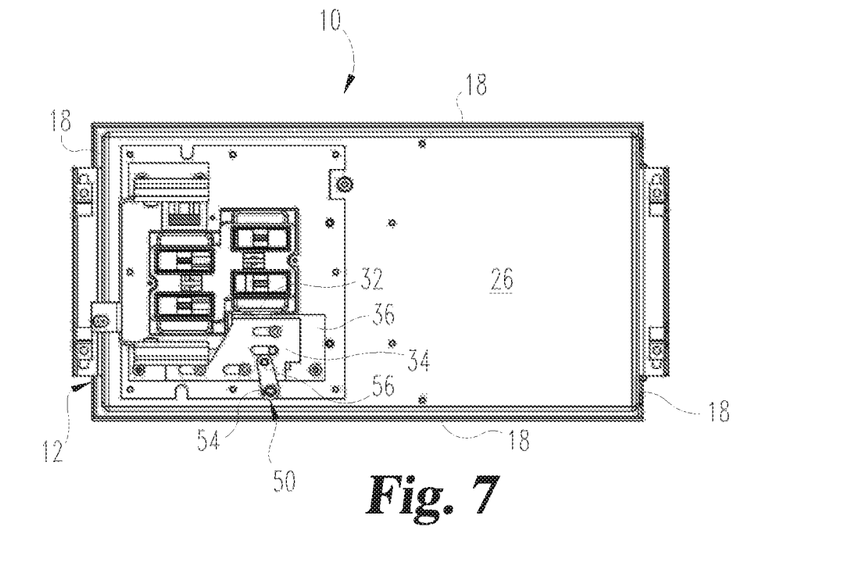
FIG. 7 is a back elevation view of the electrical system with the operational status of the handle system corresponding to an OFF (OPEN) position.
Figure 10:
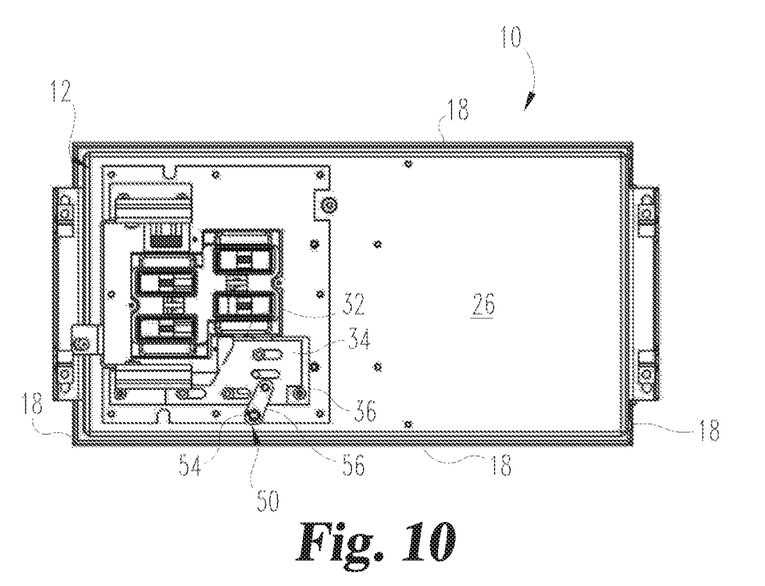
FIG. 10 is a back elevation view of the electrical system with the operational status of the handle system corresponding to an ON (CLOSED) position.
Figure 11:
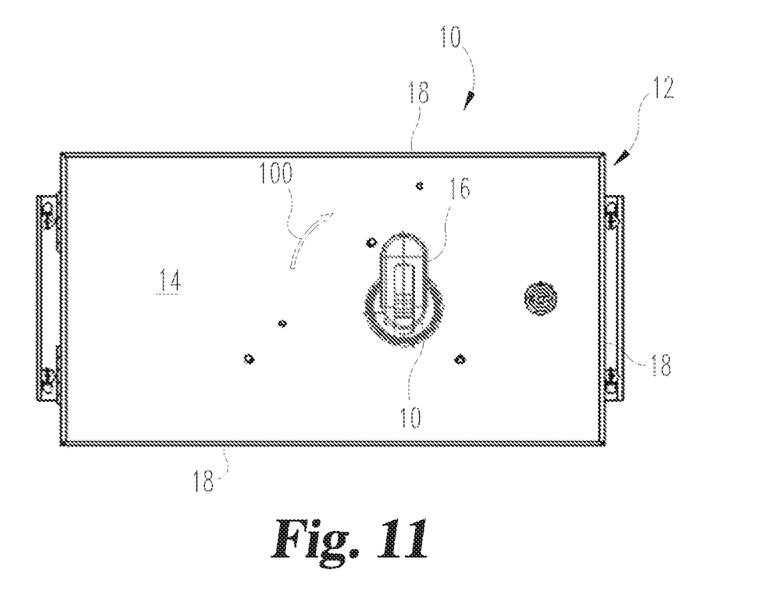
FIG. 11 is a front elevation view of the electrical system with the operational status of the handle system corresponding to an ONF (CLOSED) position.
Figure 12:
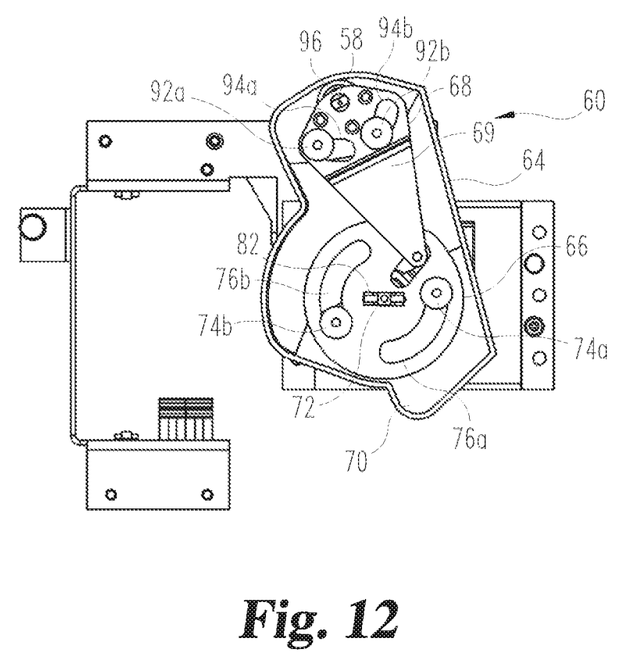
FIG. 12 is a front elevation view of the interlock mechanism with the cam cover removed and with the operational status of the handle system corresponding to an ON (CLOSED) position.

In order to rotate first shaft 52, a cam assembly 60 is provided that is operated by handle 16. Cam assembly 60 includes a first plate-like cover 62 that is mounted to a second plate-like cover 64. A first cam 66 and a second cam 68 are housed in a cavity 70 defined by and between covers 62, 64. Covers 62, 64 can be mounted on an interior side of door 14. A second shaft 72 extends between and is engaged to electrical device 28 and operating handle 16 through plates 62, 64 when door 14 is closed. Second shaft 72 can be used to turn electrical device 28 off and on by rotating operating handle 16 between an OFF position (FIGS. 7-9) and an ON position (FIGS. 10-12.) Second shaft 72 is keyed to first cam 66 in central hole 82 so that first cam 66 rotates with rotation of second shaft 72 via operation of operating handle 16 and/or in response to electrical device 28 tripping. Second shaft 72 can be configured so that it is disengaged from operating handle 16 and remains engaged to electrical device 28 when door 14 is open, or is disengaged from electrical device 28 and remains engaged to operating handle 16 when door 14 is open. In one embodiment, first shaft 52 and second shaft 72 are parallel to one another.

First cam 66 includes a generally circular shaped body 67 defining a first arcuate slot 76a and a second arcuate slot 76b about central hole 82. First and second pins 74a, 74b extend through respective ones of the slots 76a, 76b and rotatably secure body 66 to cover 64. Body 67 also includes a radial groove 78 on one side of body 67 that is coupled to second cam 68.

Second cam 68 includes a generally triangularly shaped body 69 that is rotatable relative to second cover 64. Body 69 includes a coupling member 90 at an apex thereof that is received in an arced groove 78 of first cam 66. Body 69 also includes third and fourth arcuate slots 94a, 94b that extend partially around a receptacle 96, and receptacle 96 is located on body 69 opposite of coupling member 90. Third and fourth pins 92a, 92b extend through respective ones of the slots 94a, 94b to further secure second cam 68 to cover 64 while allowing second cam 68 to rotate about receptacle 96 in response to rotation of first cam 66. Since second end 58 of first shaft 52 is captured in receptacle 96, first shaft 52 also rotates in response to rotation of second cam 68 to displace interlock device 32 as shown by arrows 48, as discussed above.

Figure 8:
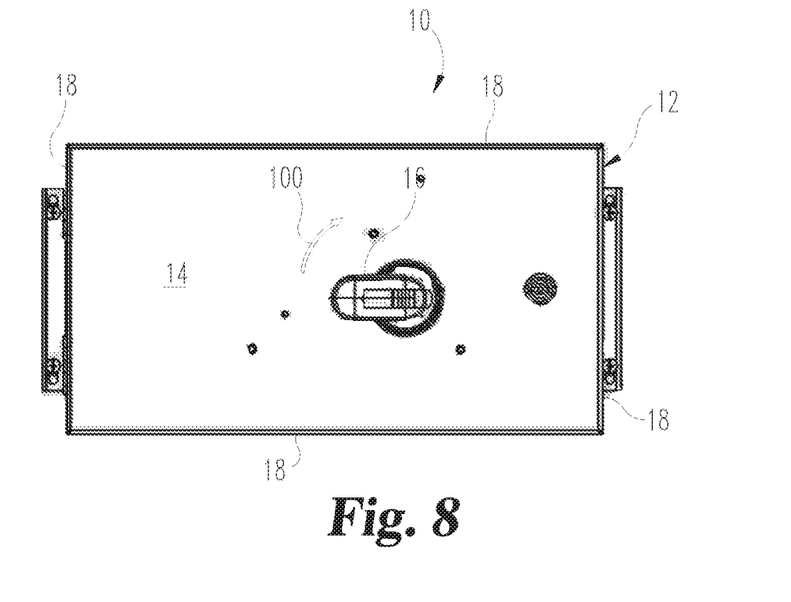
FIG. 8 is a front elevation view of the electrical system with the operational status of the handle system corresponding to an OFF (OPEN) position.

Referring further to FIGS. 7-12, operation of electrical device 28 when disposed in enclosure 12 is illustrated. Second shaft 72 is operative to rotate via rotation of operating handle 16 to turn electrical device 28 on and off. In one form, a clockwise rotation 100 from an OFF (OPEN) position as shown in FIG. 8 ninety degrees to an ON (CLOSED) position as shown in FIG. 11 is operative to turn electrical device 28 from off to on, whereas a counterclockwise rotation is operative to turn electrical device 28 from on to off. Door 14 and/or operating handle 16 may include an indicator to indicate whether the electrical device 28 is on or off depending on the position of operating handle 16. In other embodiments, the rotation directions for turning electrical device 28 on and off may be reversed.

When door 14 is open, operating handle 16 is disconnected from shaft 72, or shaft 72 is disconnected from electrical device 28, and cam assembly 60 is disconnected from actuating assembly 50. During normal operation, door 14 is closed, and external operating handle 16 is coupled to electrical device 28 via second shaft 72 through door 14, and is operative to rotate shaft 72 to turn electrical device 28 on and off as discussed above. Simultaneously, second cam 68 of cam assembly 60 is coupled to actuating assembly 50 for displacement of interlock device 32. In particular, second end 58 of first shaft 52 is engaged to second cam 68 in receptacle 96 when door 14 is closed. Therefore, rotation of operating handle 16 to turn electrical device 28 on and off also rotates first cam 66, which rotates second cam 68, which in turn rotates first shaft 52 to displace interlock device 32 and engage or lock interlock device 32 to busway structure 24 when electrical device 28 is on and disengage or unlock interlock device 32 from the busway structure 24 when the electrical device 28 is off.

In one embodiment, the slots 76a, 76b of first cam 66 are configured to allow first cam 66 to rotate between 75 degrees and 105 degrees between the on and off positions of electrical device 28, while the slots 94a, 94b are configured to allow second cam 68 to rotate between 15 degrees and 45 degrees to rotate first shaft 52 to displace interlock device 32 between the engaged and disengaged positions. In one embodiment, slots 76a, 76b are configured to allow ninety degrees of rotation of first cam 66 between the on and off positions of electrical device 28, while slots 94a, 94b are configured to allow thirty degrees of rotation of second cam 68 in the opposite direction to engage and disengage interlock device 32. In other embodiments, the amount of rotation of the first and second cams 66, 68 can be any amount that allows engagement and disengagement of the interlock device 32 from the busway structure.

Figure 9:
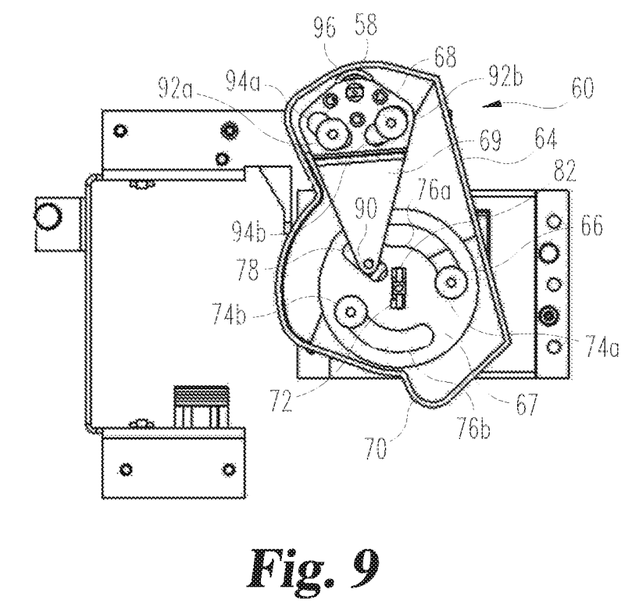
FIG. 9 is a front elevation view of the interlock mechanism with the cam cover removed and with the operational status of the handle system corresponding to an OFF (OPEN) position.

During rotation of operating handle 16 from the OFF position to the ON position, and vice-versa, coupling member 90 slides along groove 78 as shown in FIGS. 9 and 12 in response to rotation of first cam 66 via operating handle 16. It should be noted in FIG. 12 that in the ON position the second cam 68 is pivoted about receptacle 96 to rotate first shaft 52 about its longitudinal axis to displace interlock device 32.

Various aspects of the present disclosure are contemplated. According to one aspect, an electrical apparatus includes an enclosure having a door movable for access to an interior of the enclosure and an electrical device disposed in the interior of the enclosure that is operable to be turned on and off. The apparatus includes a first shaft for operating the electrical device and an operating handle on the door outside the enclosure that is operable to open and close the door. The apparatus includes a cam assembly on the door. With the door closed, the operating handle is connected to electrical device with the first shaft, and the first shaft and the cam assembly are rotated by rotation of the operating handle. The apparatus includes an interlock mechanism including an interlock device and a second shaft, the second shaft including a first end connected to the interlock mechanism and a second end that is engaged to the cam assembly with the door closed, wherein rotation of the operating handle rotates the first shaft to turn the electrical device on or off and also rotates the cam assembly which rotates the second shaft to displace the interlock device for engagement or disengagement with a busway structure.

In one embodiment, the cam assembly includes a first cam on the door and a second cam on the door that is linked to the first cam. The second cam rotates between an engaged position and a disengaged position in response to the operating handle being rotated to turn the electrical device on and off.

In one embodiment, a linking arm connects the interlock mechanism to the first end of the second shaft. In one refinement, the interlock mechanism includes a slide plate connecting the interlock device and the linking arm. In one refinement, the slide plate is slidably mounted on an exterior wall of the enclosure.

In one refinement, the slide plate includes at least three slots, and the slide plate slides along at least three studs extending through respective ones of the at least three slots, the at least three studs being mounted to the enclosure. In one refinement, rotation of the second shaft translates the slide plate along the at least three studs to displace the interlock device for engagement or disengagement with the busway structure.

In one refinement, the linking arm has a first end fixed to the first end of the second shaft. The linking arm has an opposite second end pivotally coupled to the slide plate.

In one embodiment, the electrical device is a busway tap-off device. In one embodiment, the operating handle is L-shaped.

According to another aspect of the present disclosure, a system for turning at least two shafts to operate an electrical device in an enclosure is provided. The system includes an operating handle mountable on a door of the enclosure and a first shaft engaged to the operating handle and to the electrical device in the enclosure with the door closed. The operating handle is disengaged from the electrical device with the door open, and rotation of the operating handle with the door closed turns the electrical device on or off. The system also includes a cam assembly engaged to and rotatable by the first shaft upon rotation of the operating handle with the door closed. The system further includes an interlock mechanism including an interlock device and a second shaft. The second shaft includes a first end connected to the interlock device and a second end that is engaged to the cam assembly with the door closed. Rotation of the cam assembly upon rotation of the first shaft rotates the second shaft to displace the interlock device for engagement or disengagement with a busway structure.

In one embodiment, the cam assembly includes a first cam on the door that is engaged to the first shaft and rotates with rotation of the first shaft, and a second cam on the door that is linked to the first cam. The second cam is engaged to the second end of the second shaft. In one embodiment, the first shaft and the second shaft are parallel.

In one embodiment, the interlock mechanism includes a slide plate connected to the first end of the second shaft and to the interlock device. In one refinement, the interlock mechanism includes an interlock cam connecting the first end of the second shaft to the slide plate.

In a refinement, rotation of the second shaft translates the slide plate relative to the enclosure to displace the interlock device for engagement or disengagement with the busway structure. In another refinement, the interlock cam includes a linking arm having a first end fixed to the first end of the second shaft, and an opposite second end pivotally coupled to the slide plate.

According to another aspect of the present disclosure, an electrical system includes an enclosure having a door for access to an interior of the enclosure and an electrical device in the interior of enclosure with a first shaft extending therefrom. The system includes an operating handle disposed outside the enclosure and coupled to the electrical device with the first shaft through the door with the door closed. The operating handle is operative to rotate the first shaft to turn the electrical device on or off. The system includes an interlock mechanism for selectively engaging the enclosure to a busway structure, and a cam assembly on the door that is connected to the interlock mechanism via a second shaft. The cam assembly is operable upon rotation of the first shaft via the operating handle to rotate the second shaft and displace the interlock mechanism to engage or disengage the busway structure.

In one embodiment, the cam assembly includes a first cam pivotally linked to a second cam, and the operating handle is engaged to the first cam and the second shaft is engaged to the second cam. In one embodiment, the second shaft is engaged to the interlock device via an interlock cam engaged to an end of the second shaft opposite the cam assembly.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical apparatus, comprising:
an enclosure having a door movable for access to an interior of the enclosure;
an electrical device disposed in the interior of the enclosure, the electrical device being operable to be turned on and off;
a first shaft for operating the electrical device;
an operating handle on the door outside the enclosure that is operable to open and close the door;
a cam assembly on the door, wherein with the door closed the operating handle is connected to electrical device with the first shaft, and the first shaft and the cam assembly are rotated by rotation of the operating handle; and
an interlock mechanism including an interlock device and a second shaft, the second shaft including a first end connected to the interlock mechanism and a second end that is engaged to the cam assembly with the door closed, wherein rotation of the operating handle rotates the first shaft to turn the electrical device on or off and also rotates the cam assembly which rotates the second shaft to displace the interlock device for engagement or disengagement with a busway structure.

2. The electrical apparatus of claim 1, wherein the cam assembly includes:
a first cam on the door; and
a second cam on the door that is linked to the first cam, wherein the second cam rotates between an engaged position and a disengaged position in response to the operating handle being rotated to turn the electrical device on and off.

3. The electrical apparatus of claim 1, wherein a linking arm connects the interlock mechanism to the first end of the second shaft.

4. The electrical apparatus of claim 3, wherein the interlock mechanism includes a slide plate connecting the interlock device and the linking arm.

5. The electrical apparatus of claim 4, wherein the slide plate is slidably mounted on an exterior wall of the enclosure.

6. The electrical apparatus of claim 5, wherein the slide plate includes at least three slots, and the slide plate slides along at least three studs extending through respective ones of the at least three slots, the at least three studs being mounted to the enclosure.

7. The electrical apparatus of claim 6, wherein rotation of the second shaft translates the slide plate along the at least three studs to displace the interlock device for engagement or disengagement with the busway structure.

8. The electrical apparatus of claim 3, wherein the linking arm has a first end fixed to the first end of the second shaft, and an opposite second end pivotally coupled to the slide plate.

9. The electrical apparatus of claim 1, wherein the electrical device is a busway tap-off device.

10. The electrical apparatus of claim 1, wherein the operating handle is L-shaped.

11. A system for turning at least two shafts to operate an electrical device in an enclosure, comprising:
an operating handle mountable on a door of the enclosure;
a first shaft engaged to the operating handle and to the electrical device in the enclosure with the door closed, and wherein the operating handle is disengaged from the electrical device with the door open, wherein rotation of the operating handle with the door closed turns the electrical device on or off;
a cam assembly engaged to and rotatable by the first shaft upon rotation of the operating handle with the door closed; and
an interlock mechanism including an interlock device and a second shaft, the second shaft including a first end connected to the interlock device and a second end that is engaged to the cam assembly with the door closed, wherein rotation of the cam assembly upon rotation of the first shaft rotates the second shaft to displace the interlock device for engagement or disengagement with a busway structure.

12. The system of claim 11, wherein the cam assembly includes:
a first cam on the door that is engaged to the first shaft and rotates with rotation of the first shaft; and
a second cam on the door that is linked to the first cam, wherein the second cam is engaged to the second end of the second shaft.

13. The system of claim 11, wherein the interlock mechanism includes a slide plate connected to the first end of the second shaft and to the interlock device.

14. The system of claim 13, wherein the interlock mechanism includes an interlock cam connecting the first end of the second shaft to the slide plate.

15. The system of claim 14, wherein rotation of the second shaft translates the slide plate relative to the enclosure to displace the interlock device for engagement or disengagement with the busway structure.

16. The system of claim 14, wherein the interlock cam includes a linking arm having a first end fixed to the first end of the second shaft, and an opposite second end pivotally coupled to the slide plate.

17. The system of claim 11, wherein the first shaft and the second shaft are parallel.

18. An electrical system, comprising:
an enclosure having a door for access to an interior of the enclosure;
an electrical device in the interior of enclosure and a first shaft extending therefrom;
an operating handle disposed outside the enclosure and coupled to the electrical device with the first shaft through the door with the door closed, wherein the operating handle is operative to rotate the first shaft to turn the electrical device on or off;
an interlock mechanism for selectively engaging the enclosure to a busway structure; and
a cam assembly on the door that is connected to the interlock mechanism via a second shaft, wherein the cam assembly is operable upon rotation of the first shaft via the operating handle to rotate the second shaft and displace the interlock mechanism to engage or disengage the busway structure.

19. The electrical system of claim 18, wherein the cam assembly includes a first cam pivotally linked to a second cam, wherein the operating handle is engaged to the first cam and the second shaft is engaged to the second cam.

20. The electrical system of claim 18, wherein the second shaft is engaged to the interlock device via an interlock cam engaged to an end of the second shaft opposite the cam assembly.

* * * * *